(12) United States Patent
Zaklika et al.

(10) Patent No.: US 6,850,651 B2
(45) Date of Patent: Feb. 1, 2005

(54) MOIRÉ CORRECTION IN IMAGES

(75) Inventors: Kryzstof Antoni Zaklika, Saint Paul, MN (US); Nikolai Vasil'evich Markov, Leningrad Region (RU)

(73) Assignee: Corel Corporation, Ottawa (CA)

( * ) Notice: Subject to any disclaimer, the term of this patent is extended or adjusted under 35 U.S.C. 154(b) by 707 days.

(21) Appl. No.: 09/897,716

(22) Filed: Jul. 2, 2001

(65) Prior Publication Data

US 2003/0002747 A1 Jan. 2, 2003

(51) Int. Cl.$^7$ .................................................. G06K 9/38
(52) U.S. Cl. ....................... 382/275; 382/252; 382/274; 358/3.26; 358/3.27; 358/533
(58) Field of Search .................................. 382/252, 260, 382/263, 264, 274, 275; 358/3.26, 3.27, 520, 533, 463

(56) References Cited

U.S. PATENT DOCUMENTS

| | | | |
|---|---|---|---|
| 2,407,211 A | 9/1946 | Yule | 95/5 |
| 2,420,636 A | 5/1947 | Yule | 95/5 |
| 2,455,849 A | 12/1948 | Yule | 95/5 |
| 3,011,395 A | 12/1961 | Folse | 88/24 |
| 3,615,433 A | 10/1971 | Biernson et al. | 96/27 |
| 4,237,481 A | 12/1980 | Aughton | 358/80 |
| 4,303,943 A | * 12/1981 | May | 348/616 |
| 4,315,318 A | 2/1982 | Kato et al. | 364/515 |
| 4,317,179 A | 2/1982 | Kato et al. | 364/515 |

(List continued on next page.)

FOREIGN PATENT DOCUMENTS

| | | | | |
|---|---|---|---|---|
| EP | 1002912 A2 | 7/2000 | | H04N/9/04 |
| JP | 51/45757 | 6/1993 | | G03G/15/01 |
| JP | 1972/95961 | 11/1995 | | G06F/17/10 |
| JP | 8/149358 | 6/1996 | | H04N/5/232 |
| JP | 10/003539 | 1/1998 | | G06T/5/20 |
| JP | 10/273331 | 10/1998 | | H04N/1/409 |
| JP | 11/275367 | 1/2000 | | H04N/1/409 |
| JP | 2000/023085 | 1/2000 | | H04N/5/91 |
| WO | WO 98/36555 | 8/1998 | | H04N/1/04 |

OTHER PUBLICATIONS

B. R. Frieden. "A New Restoring Algorithm for the Preferential Enhancement of Edge Gradients," *J. Opt. Soc. Am.*, vol. 66, No. 3, Mar. 1976.

(List continued on next page.)

*Primary Examiner*—Bhavesh M. Mehta
*Assistant Examiner*—Yosef Kassa
(74) *Attorney, Agent, or Firm*—Hensley Kim & Edgington, LLC

(57) ABSTRACT

Image defects in a digital image are reduced by a process comprising:
  providing a digital image data set in the form of a matrix of pixels;
  selecting a sub-matrix comprising at least a 5×5 matrix of pixels;
  identifying a pixel within the sub-matrix to be treated as a central pixel;
  determining a value for at least one optical property in the central pixel;
  selecting at least four pixels around the central pixel as averaging pixels, at least two of the averaging pixels being in a position in the sub-matrix that is not adjacent the position in the matrix of the central pixel;
  determining a value for the at least one optical property for the at least four averaging pixels;
  averaging the values for the at least one optical property for more than one of the at least four averaging pixels to provide an average treatment value for the central pixel;
  assigning the average treatment value for the central pixel to the central pixel; and
  storing the average treatment value assigned to the central pixel.

34 Claims, 4 Drawing Sheets

U.S. PATENT DOCUMENTS

| | | | |
|---|---|---|---|
| 4,334,244 A | 6/1982 | Chan et al. | 358/166 |
| 4,336,558 A | 6/1982 | Lew | 358/285 |
| 4,346,409 A | 8/1982 | Ishida et al. | 358/280 |
| 4,571,635 A | 2/1986 | Mahmoodi et al. | 358/284 |
| 4,926,267 A | 5/1990 | Shu et al. | 258/454 |
| 4,965,599 A | 10/1990 | Roddy et al. | 346/160 |
| 4,987,496 A | 1/1991 | Greivenkamp, Jr. | 358/448 |
| 5,107,188 A | 4/1992 | Rindal | 315/370 |
| 5,121,213 A | 6/1992 | Nishioka | 358/213.11 |
| 5,159,469 A | 10/1992 | Takagi | 358/454 |
| 5,166,810 A | 11/1992 | Sorimachi et al. | 358/462 |
| 5,225,915 A | 7/1993 | Ciccone et al. | 358/454 |
| 5,239,390 A | 8/1993 | Tai | 358/458 |
| 5,253,046 A | 10/1993 | Shiraishi | 358/43 |
| 5,351,312 A | 9/1994 | Sato et al. | 382/50 |
| 5,408,337 A | 4/1995 | Kanda | 358/447 |
| 5,649,031 A | 7/1997 | Nakamura et al. | 382/254 |
| 5,798,846 A | 8/1998 | Tretter | 358/456 |
| 5,799,111 A * | 8/1998 | Guissin | 382/254 |
| 5,821,915 A | 10/1998 | Graham et al. | 345/138 |
| 6,094,018 A | 7/2000 | Fujimori et al. | 315/370 |
| 6,532,040 B1 * | 3/2003 | Kozlowski et al. | 348/241 |
| 6,539,106 B1 * | 3/2003 | Gallarda et al. | 382/149 |
| 6,587,142 B1 * | 7/2003 | Kozlowski et al. | 348/241 |

OTHER PUBLICATIONS

S.R. Amtey, et al. "Application of Digital Processing in Computed Radiography," *SPIE* vol. 201, 1979; 210–212.

C. R. Wilson, et al. "Low Frequency of Digital Radiographic Images," *SPIE* vol. 314, 1981; 237–330.

E. Alparslan, et al. "Image Enhancement by Local Histogram Stretching," *IEE* Col. SMC–11, No. 5, May 1981; 376–385.

J. Ching–Yu Yang, et al., "Suppression of Moire Patterns in Scanned Halftone Images by Double Scans with Grid Movements," *Pattern Recognition Letters* vol. 18(3), 1997; 213–227.

N. Ohyama, et al., "Suppression of Moire Fringes Due to Sampling of Halftone Screened Images," *Optics Communications*, vol. 60(6), Dec. 15, 1986; 364–368.

Kai Krause, "Photoshop: Kai's Power Tips & Tricks," http://www.pixelfoundry.com/Tips, Sep. 17, 2001; 1–6.

X. Liu, et al., "Analysis of Moire Patterns in Non–Uniformly Sampled halftones," *Image Vis. Comput.*, vol. 18(10); 843–848.

Joseph Sho–Pyng Shu, "Moire Factors and Visibility in Scanned and Printed Halftone Images," *Optical Engineering*, vol. 28(7), Jul. 1989; 805–812.

\* cited by examiner

MOIRÉ CORRECTION IN IMAGES

BACKGROUND OF THE INVENTION

1. Field of the Invention

The present invention relates to image data, particularly image data that is provided as an image file, and particularly image data that generates an image and may contain moiré patterns, particularly color images that display moiré patterns in virtual or real images.

2. Background of the Art

Recorded images comprise a spatial, normally planar, representation of either spatially or temporally variable original signals. A large proportion of such recordings, such as copies of documents and pictures, represent a one-to-one relationship with an original document or scene, frequently with magnification or reduction involved. Radiographic film images in medicine represent a class of images where the original is not visible to the human eye and must be formed by a combination of invisible radiation (e.g., x-rays) and a suitable transducer (fluorescent screen).

In all image forming systems, degradation of the original information occurs which normally manifests itself in at least three forms: (1) blurring of edges (reduced resolution, lower sharpness); (2) random irregularities (noise, fog); and (3) image format artifacts (e.g., smudging, spreading, moiré patterns, blocking and trapping). In normal photographic images, it has long been known that edge sharpness can be enhanced and noise reduced by masking the original with a negative unsharp mask of suitable contrast (usually with lower contrast than that of the original). Early work by J. A. C. Yule is representative of this photographic masking approach (U.S. Pat. Nos. 2,407,211, 2,420,636, 2,455,849) and more complex approaches are represented by Blearson et al. in U.S. Pat. No. 3,615,433. An early attempt to use a raster scanning of the image while measuring the instantaneous light values photoelectrically and attenuating the beam according to a predetermined relationship with the light value is disclosed by Folse in U.S. Pat. No. 3,011,395. The rapid development of the Space Program lead to the emergence of high efficiency digital means of analyzing, reconstituting and enhancing images. Median filtering as a means of enhancing edge contrast has also been studied (e.g., B. R. Frieden JOSA 66. 280–283 (1976)). In the medical radiography field this stimulated the development of computerized tomography and the digital processing of radiographs in general (S. R. Amety et al, SPIE 207, 210–211 (1979), and C. R. Wilson et al, SPIE 314, 327–330 (1981)). In these approaches the image has been divided into a large number of "pixels" by scanning. A moving window consisting of nxm pixels centered on pixel i with image value $D_i$ is investigated by an on line computer as pixels i are scanned. The arithmetic average D of the pixels within the window is then used to modify the central pixel value $D_i$ to a filtered value $D'_i$ by the algorithm:

$$D'_i = aD_i - bD$$

The parameters a and b are chosen to give specific image characteristics but are constant over the scan of a single image.

The concept of varying parameters similar to a and b throughout the scan of the image based on certain local properties of the image has been studied and these patents (H. Kato et al U.S. Pat. Nos. 4,315,318 and 4,317,179 and M. Ishida et al U.S. Pat. No. 4,346,409) have disclosed particular relationships between the parameters and the values of $D_i$ or D which can give further image enhancement. These techniques do not however distinguish between noise and image edges as far as enhancement is concerned, and the higher the density $D_i$ or D the greater the enhancement.

In other imaging technology areas, similar approaches have been made. Thus in E. Alparslau and F. Ince, IEEE Vol SMC-11, 376–384 (1981), images are treated with an edge enhancement algorithm based in part on an adaptive parameter based on the difference between the maximum and minimum pixel values in the window at any point. In U.S. Pat. No. 4,237,481 final image data for printing plate production is treated by electronic circuits according to algorithms that combine sharp and unsharp image data with pixel parameters. U.S. Pat. No. 4,334,244 treats video signal images electronically according to algorithms based on the fixed average and wherein values acting on the instantaneous gradient of the image signal, the degree of edge enhancement being partly controlled by the dynamic noise of the system.

U.S. Pat. No. 4,571,635 describes a method of displaying or recording an image showing enhanced detail (particularly edge detail) relative to an original image or record comprising:

(a) making a point by point record of the original image by scanning it in a manner to select successive pixels in a logical array, (b) storing the pixel values in such a way and for such a period that a window comprising a sub-array of adjacent pixels can be selected and analyzed statistically, said window comprising between 5 and 225 pixels, (c) analyzing the pixel values of the window surrounding each pixel in turn to give the average value D and the standard deviation sigma, (d) processing the central fixed value $D_c$ to give an improved value $D'_c$ such that $$D'_c = kD_c + (1-k)D$$

wherein k is a variable having a value between 0 and 0.99 which varies from pixel to pixel based on the value of sigma, said value of k being related monotonically to sigma in such a way as to have an upper and lower bound within the said range 0 to 0.99, and (e) displaying or recording the enhanced image based on the derived values $D_c'$. In effect, the process averages optical density values, establishes a trend adjacent an edge, and then adjusts the density of individual pixels to continue the established trend.

Each of these references relates to image correction of edge defects through the use of software embodying algorithms that assist in the visual correction of the specifically identified region of defects, edges in the image. However, there arises a problem in reading an original image such as a photograph or a painting having thick portions and thin portions provided as a dot image by a half tone etching method. More specifically, because of the relation between the pitch between each of the dots and the reading pitch by the image pickup device, or of a subtle deviation of phase based on the period and the like in half tone processing, a periodical pattern of thick and thin portions called moiré pattern is generated, providing trouble in viewing.

Moiré patterns result from the interaction of the spatial frequencies of at least two spatially extended periodic patterns when they are superimposed. The visual effect varies widely depending on the relative angular orientation, translation and frequency distribution in two the patterns. In some cases moiré can lead to pleasing design effects but in most situations in graphic arts moiré is to be avoided. Examples of undesirable moiré patterns are those formed in computer monitors or by overlap of color separations in color printing. One area in which moiré is a particular problem is in digital imaging, where images are formed as regular grids of picture elements or pixels. Such grids are associated with particular spatial frequencies that can interact with other spatial frequencies of components present in devices that are part of the imaging chain. A commonly encountered situation involves the scanning of colored halftone printed media, such as those composed of regularly spaced dots of colored ink of varying size. Typically, the scanner contains a detector such as a CCD (Charge Coupled Device) array and the spacing of the array interacts with the spacing of ink dots to produce an undesirable moiré pattern in the scanned image.

The occurrence of such moiré patterns is well known in digital imaging. One commonly found form of moiré is of high spatial frequency in which the separation between elements of the moiré pattern is comparable to the size of the smallest details in the image. It is common to remove this type of moiré pattern with some form of smoothing or blurring. In this procedure a compromise is made between elimination of the moiré pattern and the loss of authentic fine detail in the image. There have been attempts to eliminate the moiré in the scanner itself by optical blurring, as described in U.S. Pat. Nos. 5,159,469, 5,121,213, 4,987,496 European Patent 1,022,912 or Japanese Patent 8/149,358, or by adding noise or jitter to the scanning process, as described in U.S. Pat. No. 4,336,558 or Japanese Patent 51/45,757. Other attempts include matching the scanning frequency to spatial frequency elements in the material to be scanned as disclosed in U.S. Pat. Nos. 5,253,046, 4,965,599 or European Patent 960,523 or in Shu, J. S.-P., Springer, R. and Yeh, C. L., *Optical Engineering*, v.28(7), 805–12 (1989). There have also been efforts to combine multiple scans of the same subject in order to reduce moiré as is disclosed in U.S. Pat. No. 6,100,929, Ohyama, N., Yamaguchi, M., Tsujiuchi, J., Honda, T. and Hiratsuka, S., *Optics Communications*, v.60(6), 364–8 (1986) or Yang, C.-Y. and Tsai, W.-H., *Pattern Recognition Letters*, v.18(3), 213-27 (1997). Actions performed mechanically or electrically within the scanner can also be accomplished by digital computation. Thus, for example, U.S. Pat. No. 5,225,915 teaches the enhancement of image noise in order to mask moiré patterns. Scanners have been designed including computational means for blurring noise. For example, Japanese Pat. Wei 10/276,331 discloses an averaging circuit, Japanese Pat. Wei 11/275,367 the use of a moving average and U.S. Pat. No. 5,821,915 the use of a weighted average filter, while Japanese Patent [2,000/023,085] teaches the use of a median filter for moiré suppression in a digital camera. Further, U.S. Pat. No. 5,239,390 teaches a descreening method using an iterative smoothing filter tuned to the frequency of the halftone screen, while U.S. Pat. No. 5,166,810 discloses the removal of halftone mesh patterns by a combination of a smoothing filter and edge emphasis, and U.S. Pat. No. 4,907,096 claims descreening by filtering in the Fourier (or spatial frequency) domain. In addition to such low-pass filtering methods, there have been attempts to blur the image using specially shaped or directional filters. Thus, Japanese Pat. 1972/95,961 describes a 2D filter with an axially symmetric impulse response, Japanese Wei Patent 10/003,539 discloses smoothing in the direction of minimum brightness variation, U.S. Pat. No. 5,351,312 teaches a spatial filter with positive coefficients in the main scan and cross-scan directions with negative coefficients in the diagonal directions, U.S. Pat. No. 5,649,031 claims a smoothing filter with maximum smoothing in a direction slanted with respect to the scan direction, and U.S. Pat. No. 5,798,846 discusses the use of modified median filter with a specially shaped (e.g., cross-shaped) filter window.

Another variant of moiré defect occurs as widely spaced color bands or blotches when colored halftone images are scanned. The spacing between these bands is very much larger than the scale of the finest authentic details in the image. Thus, approaches for removing moiré using blurring are completely unsuitable for removing this type of defect since blurring sufficient to reduce the bands will completely destroy small, and often medium scale, detail in the image. This moiré color banding is not unusual in scans produced by consumer scanners and there is a need for a method to eliminate it. No generally applicable and straightforward methods exist for achieving this objective. One method has been described by Kai Krause, originally in an electronic Compuserve Forum, and now available on the world wide web at http://www.pixelfoundry.com/Tips/ under the title "Tip 10: Litter Removal: Moire Removal". This article teaches a method of removal of fine moiré patterns using Gaussian blurring. Additionally, it discloses an approach for reducing color bands. This latter method relies on splitting the image into color channels such as red, green and blue and editing a look-up table that transforms each of these colors. The principle involves manually examining each of the bands for the range of color intensities present in a given channel and then manually editing a linear look-up table in such a way that this range of input intensities becomes equal to a single average intensity after color transformation using this table. This approach does not admit automation and requires that there must first be available a method of editing look-up tables, something not normally found in consumer software. In practice it is very difficult to accomplish the disclosed correction in a way that leaves the edges of bands looking natural and blended with the image. If the color bands are not contained in a single color channel, multiple channels must be edited in the way described. This is the situation in the common case of skin tones, which can be accompanied by yellow banding, and would therefore require at least the red and green channels to be edited. Another disadvantage of this method of band elimination is that, while the alteration may lead to reduction in banding, it also influences the same color channel in regions of the image where there is no banding. This introduces new defects. To cope with this problem, it is necessary to select separate regions of the image and correct these regions individually. A further disadvantage of this approach is that it reduces the total number of colors in the image. In summary, the success of the published procedure depends very much on the specific image content, requires great skill and familiarity with image processing concepts, must be accomplished by time-consuming region-by-region correction of the image, and cannot be automated. There remains, therefore, a need for a simple process for removing moiré-related color bands that can operate rapidly on a complete image. The current widespread availability of inexpensive consumer scanners exacerbates this need.

The line screen that determines the ink dot spacing in halftone printing varies with the print medium. It can, for example, be about 80 lines per inch for newspapers, about 133 or 150 lines per inch for magazines and books, and as high as about 200 lines per inch or more for high quality art reproduction, posing a wide variation in halftone spatial frequencies. At the same time scanners and their hardware components differ widely. In some examples of consumer scanners (as noted in X. Liu and R. Erich, *Image Vis. Comput.*, v.18(10), 843-8 (2000)) non-uniform resampling of the image in the scanner introduces extra aliasing components and complicates the moiré pattern. It can be expected that combinations of different printed media with different scanner hardware will produce widely differing moiré patterns of the color band type. It is, therefore, surprising that the present invention can, in a simple way, reduce such moiré color bands in a broad variety of images from such sources.

A method has been proposed to prevent the generation of the moiré pattern, in which dimension or pattern of a dither matrix is changed in half tone processing. However, the moiré pattern cannot be eliminated by this method when the reading pitch (the pitch between pixels in the image pickup device) itself is the cause of the moiré pattern.

Under another method, the moiré pattern has been eliminated by arranging a filter for eliminating the moiré pattern in a light path in reading the original image and by gradation of the image by dispersing the image focused on one pixel of the image pickup device onto adjacent pixels. However, the moiré pattern cannot be eliminated in all of the images having thick portions and thin portions even by this method when a plurality of images with thick portions and thin portions having different dot pitches are included in the original image.

In image forming apparatus, such as copy machines, an image is read by an image-reading unit as a digital signal, and the digital signal is supplied to a recording unit so as to obtain a reproduced image on a hard copy. In such an image-reading unit, an original is read out by an image sensor such as a CCD (Charge Coupled Device) image sensor by dividing the image into small areas, that is, pixels. An analog electric signal obtained by the image sensor is converted into a digital signal, and then various image-processing operations are applied to the digital signal so as to obtain optimum image data in accordance with the image characteristics thereof. In this type of image forming apparatus, an original is read out by a line sensor or the like having a small pixel size. Accordingly, when intensity change of the original image has periodicity such as in a half tone image, there is a possibility of formation of moiré in a recorded image due to interference of the periodicity of the intensity change of the original image with the pitch of the image sensor arranged in the line sensor, that is, the sampling period. This moiré can be eliminated by suppressing the periodicity of the intensity change through a plurality of pixels by averaging the intensity of the pixels. However, when intensities of a plurality of pixels are averaged to eliminate a moiré, the resultant character image or continuous-tone image may be undesirably blurred. Therefore, there is a problem in that when a mesh image and a character image or a continuous-tone image are mixed in one original image, the averaging process must be applied only to the mesh image area.

The reproduction of intermediate tone in such digital copying machines is generally achieved by a dither method or a density pattern method. However, such methods have been associated with the following drawbacks: (1) if the original image is a screen-tone image such as a printed image, the copied image may show stripe patterns which do not exist in the original image; and (2) if the original image contains line-tone images or characters, the image quality may be deteriorated as the edges are broken by the dither method. The phenomenon (1) is called moiré and is induced by:

(a) a frequency phenomenon between the screen-tone original image and the input sampling; or (b) a frequency phenomenon between the screen-tone original image and the dither threshold matrix.

The phenomenon (b) becomes particularly evident when the dither threshold values are arranged in a dot concentrated pattern. In such case the reproduced image has a pseudo-screentone structure, which generates a frequency phenomenon with the screentone structure of the input image, thus creating moiré patterns.

U.S. Pat. No. 4,926,267 describes a method for use in reducing moiré patterns during reproducing a halftone original having extent along first and second directions, the original being formed from halftone dots situated along a screen direction and having a spatial frequency $f_{SCR}$ and period $P_{SCR}$ in the screen direction comprising:

providing gray level values for an array of pixels extending over the original, the pixels having a first spatial frequency $f_{SCR1}$ in said first direction and a corresponding first period $P_{SCR1}$ in said first direction;

developing a first gray level value for each pixel of the array whose gray level value equals or exceeds a threshold gray level value and developing a second gray level value for each pixel of the array whose gray level value is less than the threshold gray level value, said first and second gray level values defining a set of thresholded gray level values for said pixels;

determining from said set of thresholded gray level values adjacent pairs of pixels of the array in the first direction whose thresholded gray level values are different, each adjacent pair of pixels bordering a corresponding halftone dot;

determining from the gray level values of the pixels an edge error $e_1$ equal to $d_1/P_{SCR1}$ where $d_1$ is the approximate distance along the first direction between the center of the pixel the pair whose thresholded value is equal to said first gray level value and the closest edge of the corresponding halftone dot;

and processing said thresholded gray level values of said pixels of said array including: (a) using a processing window to define successive sub-arrays of said pixels and for each sub-array of pixels: (i) adding the edge errors $e_1$ for the determined adjacent pairs of pixels included in the sub-array to form a sum $S_1$; and (ii) for the pixels having thresholded second gray level values and being in the determined adjacent pairs of pixels, starting with the pixel of the adjacent pair of pixels having the highest edge error and continuing with further pixels of the adjacent pairs of pixels in the order of descending edge error, changing the thresholded gray level values of the pixels from said second to said first threshold gray level value until the thresholded gray level values of M pixels have been changed, where M is the closest integer to the sum $S_1$.

U.S. Pat. No. 5,408,337 describes an image processing apparatus in which a moiré pattern occurring in a half tone area can be eliminated by a suitable filter. A plurality of data blocks comprising N*N pixel data are transformed by means of a two-dimensional orthogonal transform so as to obtain an N*N matrix transformation factor block. An evaluation block is prepared which comprises N*N transformation factors each of which is the mean value of the absolute values of corresponding factors from a data block being considered and data blocks surrounding the data block to be determined. Mean values A[i] and B[i] (i=0 to L−1) of predetermined transformation factors are calculated, A[i]

being mean values of factors included in a number L of first areas consecutively positioned along a diagonal line of the evaluation block, B[i] being mean values of factors included in a number L of second areas positioned adjacent to and lower in frequency to the corresponding first areas. A filter selection signal is generated which corresponds to the number i when a condition is satisfied where A[i]>B[i] and A[i]>threshold value th1. The pixel data corresponding to the evaluation block is smoothed by the selected filter.

As noted above, moiré patterns can also be generated in monitors or other cathode ray tubes. Color cathode ray tubes ("CRTs") are commonly used as visual display devices, employing up to three electrodes, typically one for each primary color: red, green, and blue. Most color CRTs use a shadow mask to selectively illuminate a matrix of each electrode's respective colored phosphors (i.e., red, green, and blue). CRTs normally will have a shadow mask placed behind a phosphor-coated screen. The shadow mask is usually a metal foil with numerous perforations which allow the electron beam sourced by a particular electrode to selectively strike its respective phosphor dot. The electron-beam is focused by magnetic lenses in the CRT neck into a small spot before the electron-beam reaches the shadow mask. The electron beam from the green cathode is partially occluded by the shadow mask such that the electron beam only strikes the corresponding green phosphor after passing through the shadow mask. The beam is typically larger than the shadow mask perforation size, so the shadow mask blocks part of the beam and casts a smaller shadow of the original beam onto the desired phosphor.

The dot pitch, or spacing, between adjacent shadow mask perforations, and their corresponding phosphor dots, must be as small as possible for the highest resolution. For mechanical and economic reasons, the dot pitch is generally limited to about 0.2 millimeters ("mm") to 0.3 mm for a typical high resolution display CRT. As the electron beam traverses the screen, the shadow mask includes a periodic illumination pattern depending on whether the beam either impinges upon a perforation, and consequently the phosphor, or strikes the metal foil of the shadow mask separating the perforations. Because the sweep rate of the electron beam is known, an equivalent frequency for the resulting sinusoid can be calculated, and is referred to as the spatial frequency of the shadow mask, $v_{spatial}$.

To increase the resolution of the display, the spot size of the incident electron beam must be made as small as possible. As the electron beam spot size is reduced and begins to approach the dimensions of the phosphor dot pitch, the amount of a particular phosphor that is actually struck by the beam is a function of how well the electron beam spot is aligned to the shadow mask aperture corresponding to the intended phosphor. Moreover, it must be noted that the electron beam spot shape is not constant as the beam traverses the CRT screen. In particular, the beam spot varies from a circular shape at small angles of deflection, e.g., near the center of the CRT screen, becoming more eccentric or ovaloid at higher angles of beam deflection, e.g., near the screen perimeter. If a video pattern of alternating on-off phosphors ("pixels") is displayed, some of the pixels will be seen to be exactly aligned with the shadow mask and therefore will have uniform phosphor brightness across the dot, whereas other phosphors will exhibit a nonuniform brightness, a consequence of misalignment between electron beam and shadow mask aperture. The repeating pattern of varyingly bright pixels also is seen to be of sinusoidal form, with a frequency $v_{spot}$ equivalent to half the pixel clock frequency, where one pixel clock cycle turns on the spot, and the next pixel clock cycle turns off the pixel. As the spot size of the electron beam is reduced while viewing the on-off pattern, a periodic visual interference pattern known as moiré is produced in each video line scanned across the CRT. The frequency $v_{Moire}$ of the moiré interference pattern is the difference between the spatial frequency of the shadow mask $v_{spatial}$, and the frequency of the electron beam spot $v_{spot}$, or $$v_{Moire} = v_{spatial} - v_{spot}.$$

If the two frequencies $v_{spatial}$ and $v_{spot}$ were identical and in-phase, the moiré frequency $v_{Moire}$ would zero out. A moiré frequency of zero is the ideal case, where each phosphor has a corresponding shadow mask aperture through which the corresponding electron beam travels. From a particular standpoint, however, the spot size varies as a function of the electron beam deflection angle and focus voltage. Therefore, there may be a significant variation of electron beam spot size depending on the age of the CRT and position of the electron beam on the screen. Hence, the ideal case typically cannot practicably be realized. In fact, the closer the spatial frequency and the spot frequencies are to each other, the lower the moiré beat frequency $v_{Moire}$ and the more visible and objectionable the moiré interference pattern becomes. In addition, because the electron beam spot size varies across the face of the CRT, the individually scanned video lines will each produce a slightly different moiré interference, and therefore the moiré pattern itself varies as a function of electron beam position.

From an operating standpoint, the moiré interference phenomenon poses a serious aesthetic problem, since the best electron beam focus and highest image resolution results in unacceptably noticeable moiré patterns if the video signal being displayed includes alternating pixel patterns, which is a common occurrence. From the prior art teachings, the moiré interference problem has been addressed in three ways. First, the shadow mask and phosphor dot pitch can be reduced, which raises the effective spatial frequency of the CRT, thereby raising the moiré beat frequency so that it is less visible. The result is that in order to reduce the moiré effect, much lower resolution images must be displayed on a CRT that is inherently capable of significantly higher resolution. Second, the electron beam can be defocused so that the spot size of the electron beam is increased, thereby decreasing the amplitude of the phosphor illumination, which in turn reduces the amplitude of the phosphor spot frequency. The lower amplitude spot sinusoid results in a decrease of the amplitude, and therefore visibility, of the resulting moiré interference. Again, significant reduction in resolution and image quality are exchanged for only moderate reduction in moiré interference. A third option is to avoid displaying video signals with alternating pixel or phosphor illumination patterns, and to simply tolerate the resultant moiré interference patterns when they occur.

U.S. Pat. No. 5,107,188 describes how visible moiré interference is eliminated by alternately shifting the phase of the horizontal sync signal or video signals such that the phase of each video line, and hence the phase of the resulting moiré interference associated with that video line, is also alternately shifted. The phase of the moiré interferences are shifted such that persistence of vision in the human eye averages oppositely phased phosphor intensity variations occurring on alternating scan lines and/or vertical fields. When viewed by a user of the CRT, optical cancellation of the moiré interference patterns results.

U.S. Pat. No. 6,094,018 describes another method of addressing moiré patterns in a display monitor. A horizontal synchronization signal having a horizontal scanning frequency is received by a first circuit. A vertical synchronization signal having a vertical scanning frequency is received by a second circuit. A moiré correction signal that is proportional to a horizontal resolution of the displayed image is generated by dividing the horizontal scanning frequency by the vertical scanning frequency.

As can be seen, the main emphasis on the reduction of moiré patterns, both in printed and monitor images has been directed towards breaking up the relative frequencies between overlying or contiguous patterns. It is desirable to find alternative methods of reducing moiré in images, particularly within software solutions.

SUMMARY OF THE INVENTION

A matrix of pixels within an electronic image in which moiré patterns are present is treated to modify pixel densities to reduce visible moiré patterns without damaging the quality of the image content. A grid or matrix of pixels for the entire image or a section of the image is created. Sub-matrices, comprising a minimum of 7×7 pixels are used to compare optical density values of systematically located pixels that are not adjacent to a relatively central pixel within the matrix (e.g., there is at least one pixel between the central pixel and the non-adjacent pixel). For example, in a 7×7 matrix of pixels, the central pixel would preferably be compared to the four corner pixels, and the four outside row centered pixels. The optical density value of the matrix-centered pixel (or other specific optical value such as CIE L*a*b*, CIE L*u*v*, tristimulus values, color content, etc.) would be compared to the eight preferred pixels specified above. A number of the pixels, preferably less than all of the compared pixels, would be selected on the basis of their compared values being the closest within the group to the measured optical value of the sub-matrix-centered pixel. The average or mean value of the selected pixels would then be used as the optical value for the sub-matrix-centered pixel. That value would then be stored in a program for later use in generating a final image. The process would then be performed again by selecting another pixel as the sub-matrix-centered pixel. When a sufficient number (or all of the pixels) within the area to be cleansed of moiré pattern have been treated by the process and the complete image data saved in the program, the image data may then be presented in a visual form with reduced moiré pattern thereon.

BRIEF DESCRIPTION OF THE FIGURES

FIG. 1 shows a sub-matrix array of pixels with a 7×7 matrix with a matrix-center pixel and edge-centered pixels identified.

FIG. 2 shoes a 13×13 sub-matrix array of pixels with a matrix-center pixel and edge-centered pixels identified.

FIG. 3 shows a collection of sub-matrices of pixels that are used for moiré correction within a general matrix of pixels.

DETAILED DESCRIPTION OF THE INVENTION

Figure 4:
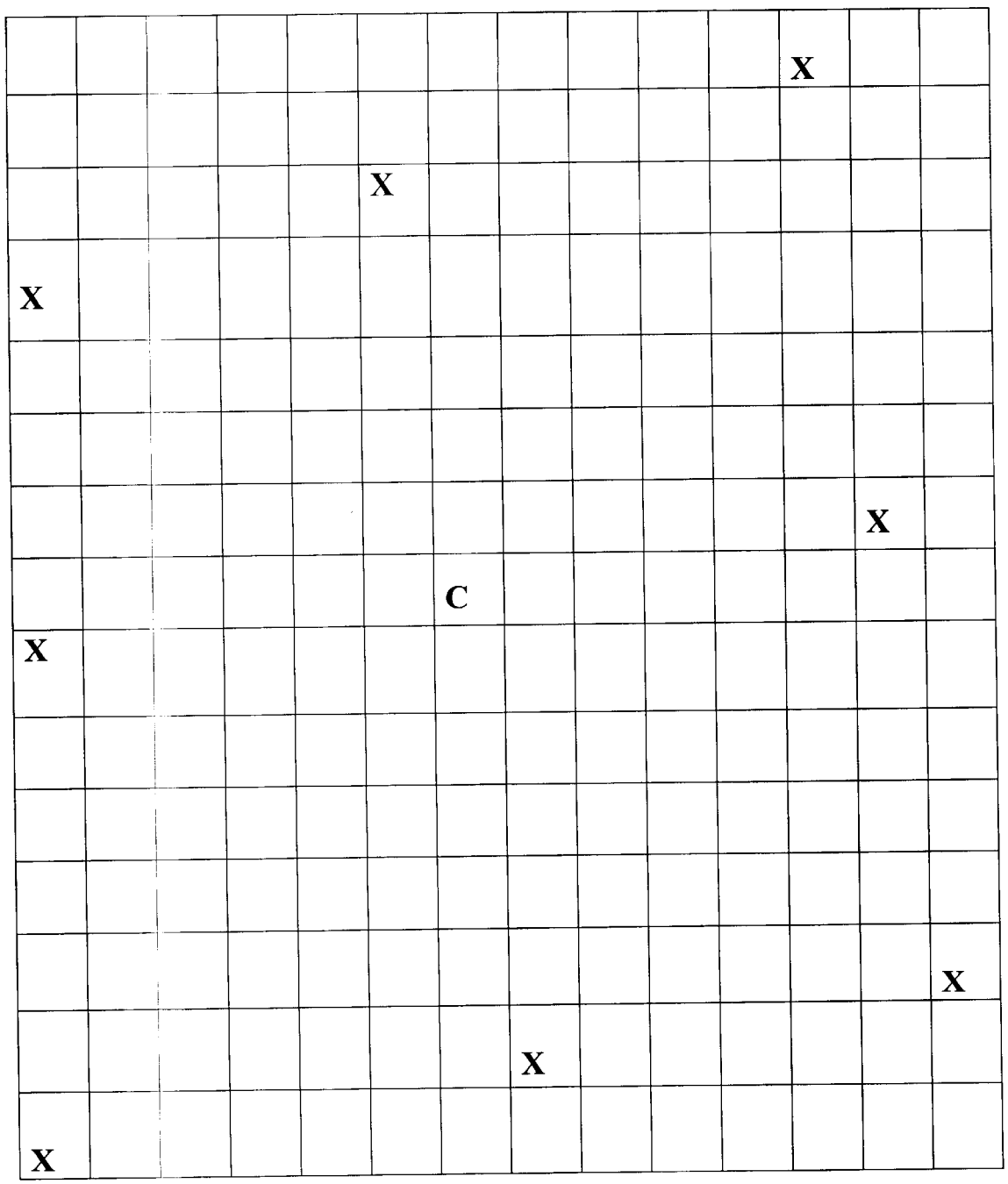
FIG. 4 shows a sub-matrix where the pixels to be averaged are selected in a rotated asymmetry around the central pixel in a parallelogram.

It is at least a desirable objective in the provision of images to provide images without flaws. In professional image-provision fields, such as advertising, web-page design, printing, sign-making, and photography, a first measure of the quality of the work is the appearance of the pictures/images provided. Certain types of flaws tend to be more obvious to visual observance than others, and the presence of moiré patterns is one of the most obvious observable technical flaws. The reason that moiré patterns tend to be so readily observable is the pseudo-pattern, or density frequency of the defect. Rather than occurring only at random independent dots (half-tone imaging), points (e.g., monitor display) or pixels (raster imaging or monitor display), moiré patterns occur over areas of the image, occur over multiple areas, and tend to cover relatively large areas of an image so that the pattern is readily observed on first viewing the image.

The correction of moiré defects has been addressed by image-makers at least since the time that half-tone imaging was first introduced and the problem occurred. The advent of digital imaging, inherently digital CRT screens, the increased use of computer imaging, and other technical advances have increased the occurrence of moiré patterns in regular business and private practice. The inherent limitation in the ability to control the image medium where a fixed spatially distributed medium is used (such as a CRT or monitor screen) requires new methodologies for correcting or at least redressing or minimizing moiré effects. It has been determined by the inventors that the use of only adjacent pixel-by-pixel analysis is insufficient to satisfactorily address the moiré effect. Although the moiré effect can be softened, adjacent pixel-by-pixel analysis still may leave a significantly visible pattern It has been found that the use of a system of pixel adjustments in which at least some distal pixel weighting in the adjustment of individual and collective pixels within the image provides a much more even and smooth reduction in the appearance of moiré patterns in the image.

To appreciate the practice of the invention, some understanding of the structure of images is desirable. All images, at some level, are constructed of sub-elements of the image. Even with what is considered an analog image (e.g., a painting created with a brush spreading paint across a surface), microscopic or sub-microscopic analysis would show pigments distributed over the surface of the substrate or canvas. Still, digital imaging is recognized as distinct from analog imaging and is defined by the existence of a collection of distinct areas of approximately equal size (e.g., half-tone imaging usually comprises dots varying in size from about 3% dots to 98% dots) that are organized in a relatively matrix pattern of columns and rows. These sub-elements or smallest image components are known in the art as pixels. The pixels themselves, especially when produced by laser imaging or other high-resolution exposure systems, may itself be formed by smaller units (e.g., in laser imaging, a pixel may be composed of a large number of spots, each spot being approximately the incident area of the laser, and in CRT displays, a pixel could comprise an area comprising a multiplicity of phosphor particles comprising either a single color or a multiplicity of colors). However, within each imaging field, the pixel is usually accepted as a specific unit of the image. For example, in laser imaging, the software program defines how many spots (including zero energy spots to reduce the image density of a pixel) will constitute a pixel and how those spots will be distributed over the pixel area. Therefore the unit of the pixel is a common working tool well understood by the imaging artisan.

In providing a computer-based image, the image is stored as a digital image, which inherently defines a system or matrix of pixels. The data is stored in a digital format, which inherently considers the image surface as a distribution of columns and rows of pixels or image components. Therefore digital or computer-based imaging is inherently subject to moiré effects and is also susceptible to a uniform mechanism of correction that cannot as readily depend upon adjustment of the pattern of lay-down of the image and must look in another direction of adjustment in the image content to overcome a moiré defect.

The present invention provides a unique basis of pixel-by-pixel adjustment to correct moiré defects in digital imaging, especially images generated from computer-stored digital data. The process comprises providing a digital image comprising a matrix of pixels; dividing the matrix into smaller sub-matrices of pixels; selecting an approximately statistically or physically central pixel or group of pixels within the sub-matrix for adjustment for correction of moiré effects; selecting at least some pixels that are distal from the central pixel or central group of pixels (distal means non-adjacent, e.g., at least one pixel is present between the central pixel or any group of central pixels and any selected distal pixel or distal group of pixels) and are generally distributed around the central pixel or central group of pixels (e.g., symmetry, near symmetry or surrounding distribution is desired); at least four distal pixels (or pixel groups), preferably at least six distal pixels (or pixel groups), and preferably at least 8 distal pixels (or pixel groups) are selected; an image property (e.g., optical density, specific color optical density, optical reflectance, hue, tone, etc, preferably some quality of optical density) is compared between all or most of the selected distal pixels and the central pixel or central group of pixels; preselecting a number of distal pixels that will be used in creating an adjusting value for the central pixel or central group of pixels (the preselected number may be the number of all of the distal pixels, but is preferably a number less than all of the distal pixels, e.g., between 40% and 75% of all distal pixels); determining which preselected number of distal pixels are the distal pixels with the closest values/properties to the central pixel or central group of pixels to define a relative group of values/properties; averaging the values/properties of the relative group; assigning the average value to the central pixel or central group of pixels; storing the assigned value for that central pixel or central group of pixels; and repeating the analysis and value storage for a different sub-matrix of pixels or for a different pixel or pixel group considered as the central pixel or central group of pixels within the original sub-matrix. This process would be repeated for the same property or for other properties (e.g., the optical density for each color in the image, e.g., cyan, magenta, yellow and black) until a user satisfactory treatment of the image has been performed, including treatment of most or all pixels within the image or repeated treatment of all or most pixels within the image.

The present invention relates to a method of removing defects from a scanned image or digitized image. In particular it refers to a virtual filter for removing moiré color bands. The virtual filter (hereinafter merely referred to as a filter or filter window) is in the form of a window that is successively centered over each pixel in the image and the values of various pixels within the window are used to compute a new, corrected value for the central pixel of the window. This new value can conveniently be written to a new output image array in order to leave unaffected the original pixel values of the image, so retaining them for calculations at different positions of the window in the input image. More specifically, the invention concerns a filter window whose size is determined by specific mathematical relationships. Additionally, only certain specific groups of pixels within this filter window are used in the calculation of the corrected pixel value.

The filter window of the invention is a square whose sides are preferably positioned parallel to the horizontal and vertical edges of the image (although skewed, rotated, parallelogram orientations may be used). An example of a non-square, non-rectangular orientation of averaging pixels in the shape of a parallelogram is shown in FIG. 4 where the eight averaging pixels in a an eight pixel selection from a 7×7 matrix have been rotated from a square symmetrical orientation to form the parallelogram. It is also envisaged that the horizontal axis of the filter window may be oriented at an angle to the horizontal axis of the image, for instance at angles commonly used as screen angles in printing (e.g. 0, 15, 45, 75, 108, 162 degrees). It is further envisaged that different orientations may be used for processing different color channels, or the same orientation may be used for all colors. The width and height of the window is an odd number of pixels such that the window can be approximately or exactly positioned symmetrically and centered on the pixel being corrected. The width and height of the window in pixels is preferably given by the formula 6k+1, where k is an integer greater than zero. Thus, the defined window sizes increase in the series 7, 13, 19, 25, 31, 37, 43, 49, 55 ... Within this series of filter windows, along with the center pixel, only the pixels at the corners of the square and the centers of the sides are used to compute corrected pixel values. Thus, for a central pixel p(i,j) having image row and column coordinates i and j respectively, the corner pixels are defined as:

$$p(i-3k, j-3k), p(i-3k, j+3k), p(i+3k, j-3k), p(i+3k, j+3k)$$

and the pixels at the centers of the edges of the window are defined as:

$$p(i, j-3k), p(i, j+3k), p(i-3k, j), p(i+3k, j).$$

The filter window is successively positioned in the image at locations corresponding to i from 1 to h inclusive and, independently, j from 1 to w inclusive, where h is the height of the image in pixels and w is the width of the image in pixels. However, it is not required to use positions corresponding to all combinations of i and j. For example, combined values of i and j can be chosen such that the filter is applied only in regions of the image where color banding is especially visible.

In a color image, at least three components are required to describe the color, for example a) red, green and blue or b) hue angle, saturation and lightness, though it is possible to use more colors, such as cyan, magenta, yellow and black with subtractive color components. In general, pixel colors can be represented in one of many color spaces, which can be transformed one space to the other. However, it is typical to transform the final image color representation to red, green and blue for display on a monitor or to cyan, magenta, yellow and black for printing. For the practice of this invention, it is advantageous to convert the image to a color space that is an opponent color space prior to applying the window filter. Such a color space has two color axes that approximately correspond to human color vision. Thus, one axis represents approximately colors ranging from yellow to blue and a second axis colors ranging from red to green. The remaining third axis is a measure of the brightness of the color. Such color axes are termed opponent since humans cannot see colors such as yellowish-blue, bluish-yellow, reddish-green or greenish-red. It will be understood by those skilled in the art that there are many color spaces with an approximately opponent property. For the practice of this invention it is sufficient that the color space has only an approximately opponent character and not an exact match to the characteristics of human vision. Examples of such color spaces include YUV, YIQ, YCC, $YC_bC_r$ and YES. It is also possible to define suitable color spaces by simple arithmetic manipulation of the red (R), green (G) and blue (B) color channels. Thus, a first color axis can be defined as R−G, a second color axis as 0.5(R+G)−B, and a third as 0.33(R+G+B). However, it is desired that the axes of the color space should correspond to similar perceptual color distances. Particularly preferred for the practice of the invention are opponent color spaces with good perceptual uniformity such as CIE L*u*v* or CIE L*a*b*. Most especially preferred is CIE L*a*b*.

During the operation of the filter, the four pixels at the corners and the four pixels at the centers of the sides of the window are ranked by similarity of color relative to the color of the central pixel p(i,j). Various measures of color difference can be used in a color space with three orthogonal dimensions, such as the Manhattan or city block distance and the Mahalanobis distance. However, it is preferred to use a simple Euclidean or Pythagorean distance computed as the square root of the sum of the squares of the color differences along each of the three axes. In the case of the CIE L*a*b* color space, this Euclidean distance corresponds to the measure known as ΔE, and is particularly preferred. Other variants of ΔE, such as $\Delta E_{CMC}$ or xE94, are known to represent color differences more according to human perception than does ΔE and can also be used as measures of color difference. However, it has been found that the extra computational effort required to calculate such more perceptually accurate distances does not normally justify itself in improved performance of the filter.

Once the eight pixels have been ranked in order of increasing color difference from the central pixel p(i,j), the colors of a certain number of the pixels with the most similar color to that at p(i,j) are averaged. While it is possible to average from two to seven of the most similar colors, it is preferred to average from three to five of the most similar colors. It is especially preferred to average the four colors that are most similar to the color at p(i,j). This average color becomes the replacement or corrected color at the central pixel p(i,j). While it is possible to compute a weighted average of the selected pixels, it has been found preferable to compute a simple average. In this way, colors can be transferred from one region of the image to another, over large distances, without destroying image detail. The specific differences selected may be based on preselected criteria. For example, if a pixel difference exceeds a specific amount (e.g., the central pixel has a gray scale value of 200, seven of the pixels have gray scale values between 100 and 220, and one pixel has a gray scale value of 10, the software selection criteria may effectively assume that an edge or boundary condition is present and exclude any pixel with such an egregious difference as compared to the other relative differences. With eight pixels or pixel groups selected, the middle six values, the six highest values, the five lowest values, or any other preselected combination may be chosen as the basis for choosing the four, five, six or seven averaging pixels.

Because colors are transferred over large distances the perceived saturation or vividness of the image color can change somewhat, especially when very large filter window sizes are used. For this reason it is preferred to use the smallest window that will remove the color banding. The most usual setting is k 3. In an opponent color space, saturation is approximately represented by the distance of a color from the lightness axis measured perpendicular to this axis. In the CIE L*a*b* color space this distance is referred to as chroma. For the purpose of further discussion the word chroma will be used to describe this distance in any opponent color space. Saturation may also be represented as chroma divided by lightness. It is possible to restore any decreased saturation in a variety of ways, for instance by constructing look-up tables based on the initial chroma histogram and that after processing with the disclosed filter. However, it has been found adequate to restore the saturation in a simpler way as follows. After operation of the disclosed filter, for every pixel in the image the chroma, C, is calculated and the maximum chroma in the image, $C_{max}$, is estimated. Then corrected chroma values, $C_{corr}$, are calculated according to: $C_{corr}=C_{max} \cdot (C/C_{max})^{1/x}$. The quantity x can range from about 1.01 to about 1.60, but the preferred value is around 1.2.

Figure 1:
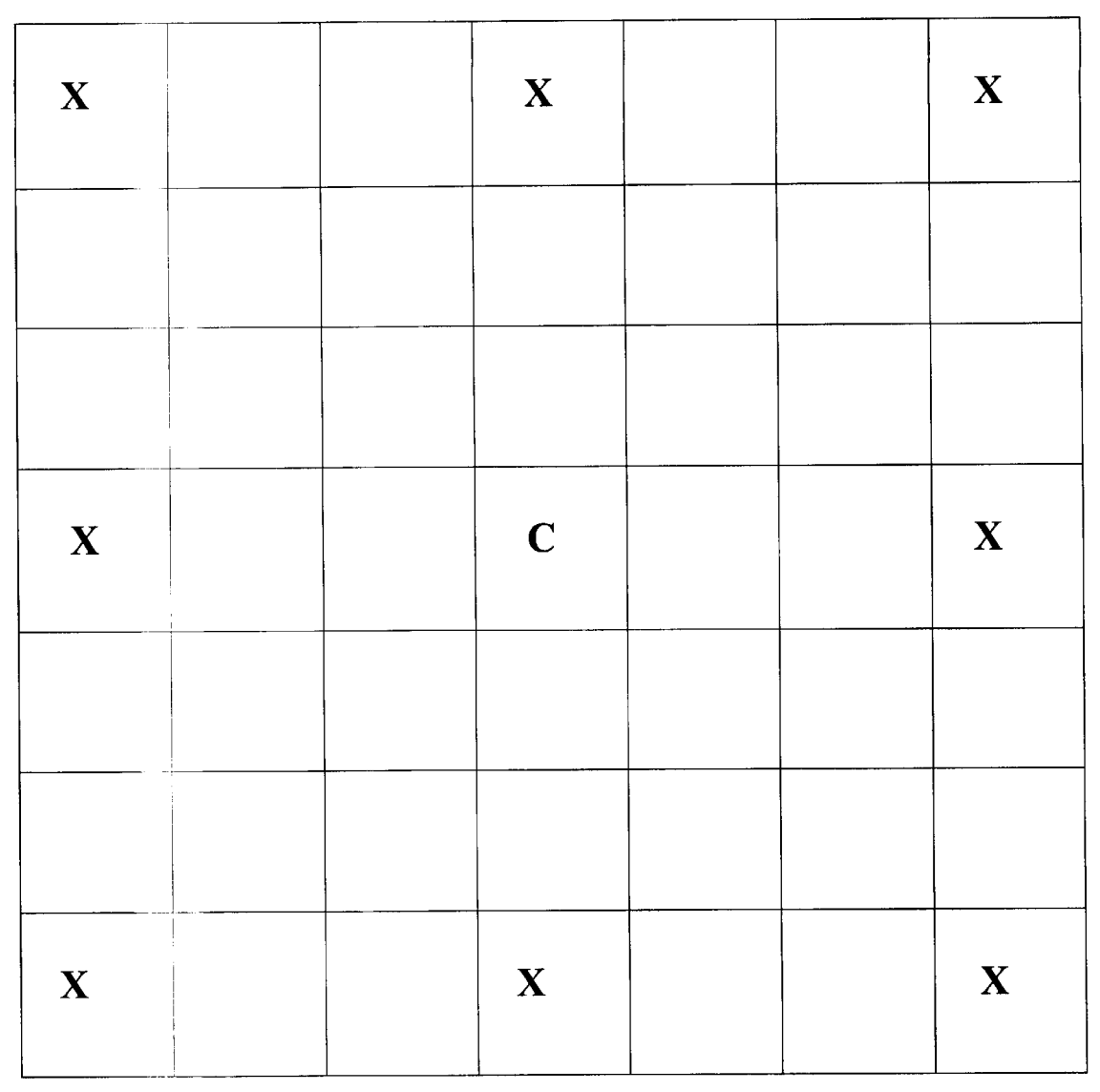

Reference to the Figures will assist in a further understanding and appreciation of the present invention. FIG. 1 shows a very simple sub-matrix for use in adjusting individual pixel density according to the present invention. FIG. 1 shows a 7×7 sub-matrix. A central pixel C is shown within the 7×7 sub-matrix. Eight surrounding distal pixels X (which are shown as symmetrically disposed, but they may be somewhat weighted, as discussed later, or not completely symmetrical, as discussed later) are shown. A simple performance of the process of the invention would be to measure the optical density of C and the optical density of each X. The optical densities of each X would be compared to the optical density of C. Either all of the optical densities of the X pixels would be averaged to produce a relative property value, or less than the number of all of the distal pixels X would be used and averaged to define a relative property value. The number may be preselected in a number of different ways, such as choosing from N distal pixels, N−1 pixels, N−2 pixels, N−3 pixels, N−4 pixels, N/2 pixels, N/2+1 pixels, N/2−1 pixels, or the like. The basis of selecting the specific pixels used in effecting the relative property value could be the selection of those pixels having the closest property value to that of the central pixel, the farthest value from the value of the central pixel, or weighted values tending towards a lower value (e.g., in selecting six distal pixels, selecting the closest four lower values and the two closest higher values) or towards higher values (e.g., in selecting four distal pixels, selecting the closest higher three value pixels and the closest lower one value pixel). The selected pixels would then be number averaged or weight averaged for the property to define a relative value for the central pixel C. That value would then be assigned to the stored data for the sub-matrix and for the image of which the sub-matrix and the pixel is a component. The procedure would be repeated for as many pixels as desired, as many matrices as desired, a percentage of pixels or all of the pixels within the image or a defined image area (e.g., a section where moiré appears).

Figure 2:
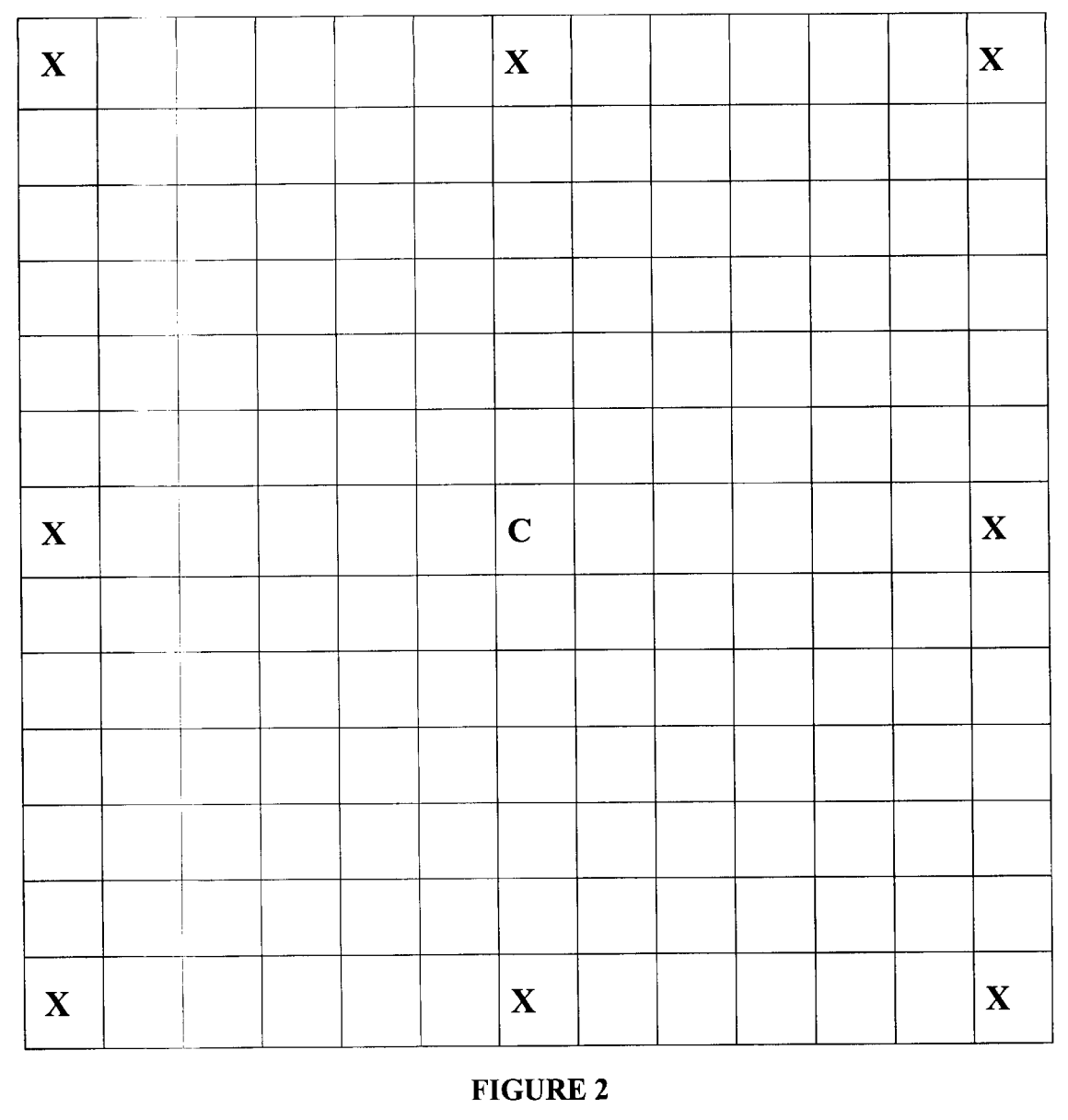

FIG. 2 is very similar to FIG. 1, showing a 13×13 matrix with the center pixel C identified and eight distal pixels X identified. Again, the distribution of distal pixels X is shown as symmetric, but that is not essential although it is desirable. For example, all or some of the distal pixels could be shifted (0,1), (1,0), (1,1), (1,−1), (0,2) or (2,0) units or the like along Cartesian coordinates.

Figure 3:
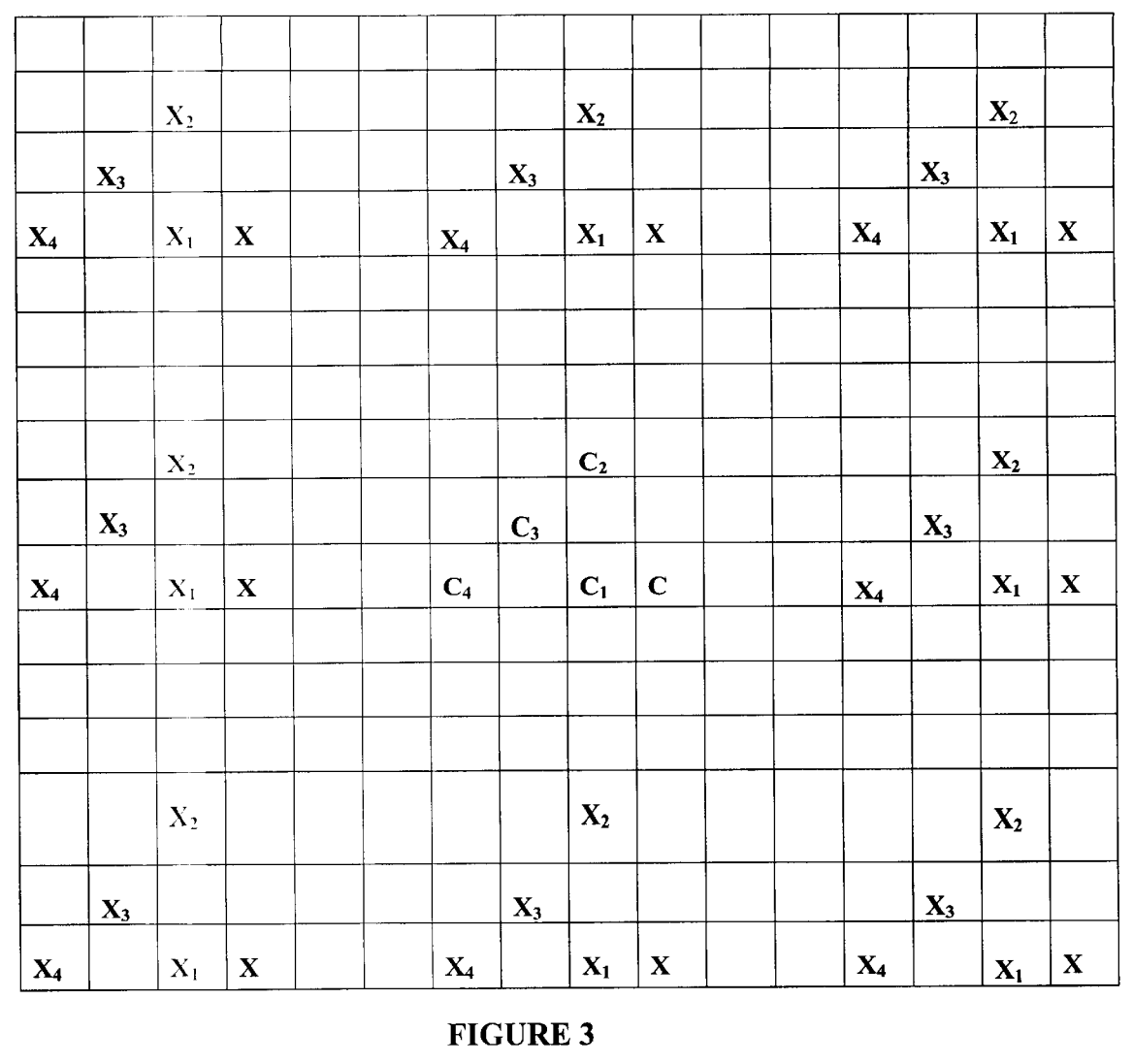

FIG. 3 shows a matrix that includes a number of sub-matrices. The distal pixels X relate to central pixel C. The distal pixels $B_4$ relate to central pixel $C_4$. The distal pixels $B_3$ relate to central pixel $C_3$. The distal pixels $B_2$ relate to central pixel $C_2$. The distal pixels $B_1$ relate to central pixel $C_1$. As mentioned earlier, rather than selecting only single central pixels (e.g., C), central groups of pixels could be used in the moiré reduction process of the invention. As shown in FIG. 3, this could be done by selecting all of pixels C, $C_1$, $C_2$, $C_3$, and $C_4$ (and or other closely positioned or adjacent pixels) as a central pixel group, and assigning a relative value determined by averaging values from distal pixels that may comprise all distal pixels shown (e.g., X, $X_1$, $X_2$, $X_3$, and $X_4$), or less than all distal pixels (e.g., only one of X, $X_1$, $X_2$, $X_3$, and $X_4$, more than one but less than all of (e.g., X, $X_1$, $X_2$, $X_3$, and $X_4$), or other combinations of these or other distal pixels. It is also possible to have some adjacent pixels considered in the averaging, as where in treating $C_1$, one or more of C and $C_3$ could be used as an averaging pixel. It is preferred that at least half, at least ⅔, at least ¾, at least ⅞ or all averaging pixels are distal pixels as defined in the present invention.

What is claimed:

1. A method of reducing image defects in a digital image comprising:

providing a digital image data set in the form of a matrix of pixels;

selecting a sub-matrix comprising at least a 5×5 matrix of pixels;

identifying a pixel within the sub-matrix to be treated as a central pixel;

determining a value for at least one optical property in the central pixel;

selecting at least four pixels around the central pixel as averaging pixels, at least two of the averaging pixels being in a position in the sub-matrix that is not adjacent the position in the matrix of the central pixel;

determining a value for the at least one optical property for the at least four averaging pixels;

averaging the values for the at least one optical property for more than one of the at least four averaging pixels to provide an average treatment value for the central pixel;

assigning the average treatment value for the central pixel to the central pixel; and storing the average treatment value assigned to the central pixel.

2. The method of claim 1 wherein the matrix is an at least 7×7 matrix of pixels.

3. The method of claim 2 wherein at least six averaging pixels are selected.

4. The method of claim 3 wherein more than one but less than all averaging pixels are used to determine the average treatment value.

5. The method of claim 3 wherein at least four averaging pixels are pixels that are not in a position adjacent in the matrix to the central pixel.

6. The method of claim 5 wherein average treatment values are defined, assigned and stored for at least 20% of the pixels in the digital image.

7. The method of claim 3 wherein all averaging pixels are pixels that are not in a position adjacent in the matrix to the central pixel.

8. The method of claim 7 wherein average treatment values are defined, assigned and stored for at least 20% of the pixels in the digital image.

9. The method of claim 7 wherein average treatment values are defined, assigned and stored for at least 80% of the pixels in the digital image.

10. The method of claim 7 wherein the central pixel comprises a group of pixels that is less than all pixels in the sub-matrix.

11. The method of claim 2 wherein at least eight averaging pixels are selected.

12. The method of claim 11 wherein more than one but less than all averaging pixels are used to determine the average treatment value.

13. The method of claim 2 wherein at least three averaging pixels are pixels that are not in a position adjacent in the matrix to the central pixel.

14. The method of claim 13 wherein average treatment values are defined, assigned and stored for at least 20% of the pixels in the digital image.

15. The method of claim 13 wherein average treatment values are defined, assigned and stored for at least 80% of the pixels in the digital image.

16. The method of claim 13 wherein the central pixel comprises a group of pixels that is less than all pixels in the sub-matrix.

17. The method of claim 2 wherein all averaging pixels are pixels that are not in a position adjacent in the matrix to the central pixel.

18. The method of claim 2 wherein at least 8 pixels are averaged to determine corrected values.

19. The method of claim 1 wherein the central pixel comprises a group of pixels that is less than all pixels in the sub-matrix.

20. The method of claim 1 wherein for at least some pixels in the image, the saturation of the at least some pixels is further modified following assigning the average treatment value for the central pixel to the central pixel.

21. The method of claim 1 wherein for at least some pixels in the image, the chroma, C, is calculated and the maximum chroma in the image, $C_{max}$, is estimated, using $C_{max}$ to determine corrected chroma values $C_{corr}$ according to the formula:

$$C_{corr} = C_{max} \cdot (C/C_{max})^{1/x},$$

wherein x is from about 1.01 to about 1.60, and these corrected chroma values are stored as at least part of stored image data.

22. The method of claim 21 wherein all $C_{corr}$ for all pixels in the image are determined and stored.

23. The method of claim 1 wherein selecting a sub-matrix comprising at least a 5×5 matrix of pixels comprises selecting a square filter of width 6k+1 pixels, where k is an integer greater than zero, positioned approximately centrally on an image pixel.

24. The method of claim 23 wherein 6k+1 is 7, and wherein from 2 to 7 pixels are selected from the group of 8 pixels constituting corners and centers of the sides of the square, and the 2 to 7 pixels are used to compute a new corrected color value for the image pixel.

25. The method of claim 23 wherein 6k+1 is selected from the group consisting of 7, 13, 19, and 25 and wherein from 2 to 13 pixels are selected from the group of total pixels in the square and the 2 to 13 pixels comprise at least some corners and centers of the sides of the square, and the 2 to 7 pixels are used to compute a new corrected color value for the image pixel.

26. The method of claim 25 wherein corrected values are determined by averaging values from the 2 to 7 pixels.

27. The method of claim 26 wherein from 4 to 13 pixels are averaged to determine the corrected values.

28. A computer with imaging system associated therewith, the computer containing software therein that directs a process for improving image defects comprising:

providing a digital image data set in the form of a matrix of pixels;

selecting a sub-matrix comprising at least a 5×5 matrix of pixels;

identifying a pixel within the sub-matrix to be treated as a central pixel;

determining a value for at least one optical property in the central pixel;

selecting at least four pixels around the central pixel as averaging pixels, at least two of the averaging pixels being in a position in the sub-matrix that is not adjacent the position in the matrix of the central pixel;

determining a value for the at least one optical property for the at least four averaging pixels;

averaging the values for the at least one optical property for more than one of the at least four averaging pixels to provide an average treatment value for the central pixel;

assigning the average treatment value for the central pixel to the central pixel;

storing the average treatment value assigned to the central pixel; and displaying the image with the stored average treatment value displayed in the image.

29. The computer with imaging system of claim 28 wherein the matrix is an at least 7×7 matrix of pixels and at least eight averaging pixels are selected.

30. The computer with imaging system of claim 29 wherein the matrix is an at least 7×7 matrix of pixels, average treatment values are defined, assigned and stored for approximately 100% of pixels in the digital image and eight averaging pixels are selected for each pixel for which average treatment values are assigned.

31. The computer with imaging system of claim 28 wherein the matrix is an at least 7×7 matrix of pixels and average treatment values are defined, assigned and stored for at least 80% of the pixels in the digital image.

32. The computer with imaging system of claim 31 wherein the central pixel comprises a group of pixels that is less than all pixels in the sub-matrix.

33. The computer with imaging system of claim 31 wherein average treatment values are defined, assigned and stored for at least 80% of the pixels in the digital image and the central pixel comprises a group of pixels that is less than all pixels in the sub-matrix.

34. A method of reducing moiré defects in a digital image comprising:

providing a digital image data set in the form of a matrix of pixels;

selecting a sub-matrix comprising at least a 5×5 matrix of pixels;

identifying a pixel within the sub-matrix to be treated as a central pixel;

determining a value for at least one optical property in the central pixel;

selecting at least four pixels around the central pixel as averaging pixels, at least two of the averaging pixels being in a position in the sub-matrix that is not adjacent the position in the matrix of the central pixel;

determining a value for the at least one optical property for the at least four averaging pixels;

averaging the values for the at least one optical property for more than one of the at least four averaging pixels to provide an average treatment value for the central pixel;

assigning the average treatment value for the central pixel to the central pixel; and storing the average treatment value assigned to the central pixel.

* * * * *